United States Patent
Giehler et al.

(10) Patent No.: US 6,937,137 B1
(45) Date of Patent: Aug. 30, 2005

(54) METHOD FOR LOCKING A MOTOR VEHICLE IN A KEYLESS MANNER

(75) Inventors: Elmar Giehler, Stuttgart (DE); Achim Wach, Markgroeningen (DE); Karl-Heinz Kaiser, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,670

(22) PCT Filed: May 18, 2000

(86) PCT No.: PCT/DE00/01560

§ 371 (c)(1), (2), (4) Date: Apr. 2, 2002

(87) PCT Pub. No.: WO00/71842

PCT Pub. Date: Nov. 30, 2000

(30) Foreign Application Priority Data

May 19, 1999 (DE) ................................ 199 22 980

(51) Int. Cl.$^7$ .......................................... G05B 19/00
(52) U.S. Cl. .............................. 340/5.61; 340/825.69; 307/10.8; 180/281
(58) Field of Search ........................... 340/825.69, 52, 340/5.72, 5.62, 5.61, 5.63; 70/256, 263; 307/10, 307/10.8; 180/281

(56) References Cited

U.S. PATENT DOCUMENTS 5,499,022 A 3/1996 Boschini ................ 340/825.69
6,496,100 B1 * 12/2002 Hiebl ........................ 340/5.31

FOREIGN PATENT DOCUMENTS

| DE | 0 523 602  | 1/1993  |
| DE | 197 35 658 | 7/1998  |
| DE | 197 11 901 | 8/1998  |
| EP | 0 158 354  | 10/1985 |

* cited by examiner

Primary Examiner—Brian Zimmerman
Assistant Examiner—Matsuichiro Shimizu
(74) Attorney, Agent, or Firm—Kenyon & Kenyon

(57) ABSTRACT

A method of keyless locking of a motor vehicle is described. A transponder exchanges a code with a transceiver. A control unit compares this code with the expected code and, if a match is found, activates a closing system of the vehicle in the sense of locking it. This control unit activates at least one display means. A locking command is generated on actuation of at least one operating element. In a first step, a search signal is delivered by the transceiver when the operating element is actuated in order to determine the position of the transponder on the basis of the response signal sent back by the transponder. In a second step, the display means is activated when the transponder is in the interior of the vehicle and/or on the side of the vehicle opposite the actuated operating element. In a third step, the closing system is activated in the sense of locking it if the operating element has been actuated again.

11 Claims, 2 Drawing Sheets

METHOD FOR LOCKING A MOTOR VEHICLE IN A KEYLESS MANNER

FIELD OF THE INVENTION

The present invention relates to a method of keyless locking of a motor vehicle.

BACKGROUND INFORMATION

European Patent No. 158,354 describes a keyless access system for motor vehicles having a portable transceiver. Authorization of a user to gain access and to drive a vehicle is verified on the basis of a signal emitted by the transceiver. If locking is desired, the user is notified by an alarm signal indicating that the transceiver is still in the interior of the vehicle in order to avoid lock-in of the transceiver. Final locking of the vehicle, however, is performed only after a certain period of time has elapsed to allow the user an opportunity to retrieve the transceiver from the interior of the vehicle within this period of time. If the user fails to do so, the vehicle is locked and the transceiver inside the vehicle is deactivated. Renewed access to the interior of the vehicle is only possible in combination with a mechanical vehicle key.

If a user does not react promptly to the warning signal transmitted, a great deal of effort is required to gain access to the vehicle again.

SUMMARY OF THE INVENTION

An object of the present invention is to provide a user-friendly operating concept without neglecting security against unauthorized use.

The method according to the present invention for keyless locking of a motor vehicle includes a transponder which exchanges a code with a transceiver. A control unit compares this code with an expected code and controls a closing system of the vehicle in the sense of locking it if the code matches. The control unit also activates a display arrangement. A looking command is generated when an operating element is actuated. In a first step, the transceiver delivers a search signal when the operating element is actuated to determine the position of the transponder on the basis of the response signal sent back by the transponder. In a second step, the display arrangement is activated when the transponder is in the interior of the motor vehicle or on a side of the vehicle opposite the operating element actuated. In a third step, the closing system is activated in the sense of locking when the operating element has been actuated again. The display arrangement provides the user with an unambiguous indication that he is about to leave his transponder inside the vehicle. This gives the user an opportunity to retrieve the transponder from the vehicle. The display arrangement is also activated when the passenger is in possession of a transponder but the driver on the driver's side actuates the operating element to trigger a locking operation. In this case, locking does not take place immediately, and instead the same warning sequence is carried out as for the case when the transponder is still in the interior of the vehicle. However, locking is performed immediately if the transponder is on the same side of the vehicle as the side where the operating element was actuated. This also covers the situation in which an unauthorized person is seeking to trigger a locking on the passenger's side when the driver is on the driver's side with the proper transponder at the same moment. In this case, locking is suppressed at first and is carried out only when the operating element-is actuated again. However, this action is preceded by display of a warning signal so that the user is notified of this critical situation.

In an advantageous refinement, the closing system is activated in the sense of locking in the third step in such a manner that the vehicle door can be opened only by an internal operating element in the interior of the vehicle. Thus, a passenger in the interior of the vehicle carrying his own transponder can leave the vehicle to escape being locked inside the vehicle. In an advantageous refinement, this possibility is provided for a predeterminable period of time. After this period of time has elapsed, the closing system will no longer allow the door to be opened by the internal operating element. Thus, in the event of a possible burglary attempt, the closing system reaches a state in which a thief is prevented from opening the vehicle by using the internal operating element after destroying the side window, for example.

In the third step, an advantageous embodiment provides for transponders recognized in the interior of the vehicle to be deactivated so that a code emitted by them is no longer recognized as permissible. Misuse of transponders remaining in the interior of the vehicle is then no longer possible. Furthermore, additional information such as the time of day or the kilometer reading can also be stored in a memory on deactivation of the transponders in the interior of the vehicle. This information can be used as evidence for insurance purposes.

An advantageous embodiment provides for activation of the transponders deactivated in the third step on unlocking of the closing system. Unlocking is preceded by an exchange of codes with a valid transponder. This guarantees that only an authorized person having a transponder can gain access to the transponders remaining in the interior. Transponders in the interior of the vehicle are of no value for a thief, however, because the information regarding deactivation of the transponder is stored in the control unit. It would be extremely difficult for a thief to gain access to this information.

DETAILED DESCRIPTION

Figure 1:
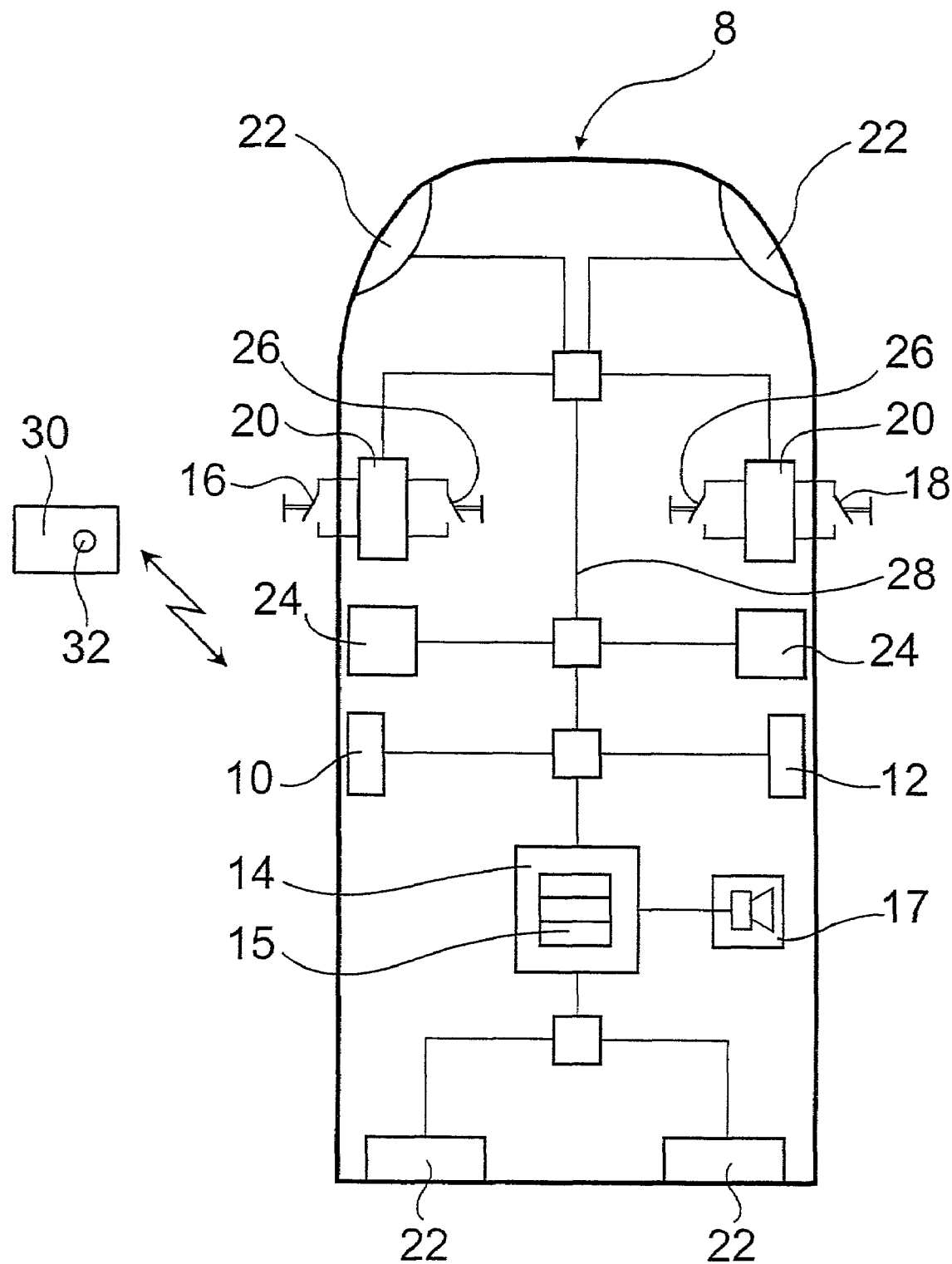
FIG. 1 shows a block diagram.

An exterior light 22 of motor vehicle 8 is activated by a control unit 14 over a bus system 28. On the left side of vehicle 8, there is a left outside operating element 16, preferably in the area of the door handle, and on the right outside there is a right outside operating element 18. Two inside operating elements 26 are located in the interior of motor vehicle 8. The switch signals of outside operating elements 16, 18 and inside operating elements 26 are relayed from a signal detection 20 to bus system 28. A transponder 30 equipped with a transponder operating element 32 exchanges signals with a left transceiver 10 arranged on the left side-of vehicle 8 or with a right transceiver 12. Left and right transceivers 10, 12 are also connected to control unit 14 over bus system 28. Locking and unlocking of the vehicle doors are handled by a closing system 24 which is designed as an electric power lock, for example. Closing system 24 is also capable of exchanging signals with control unit 14 over bus system 28. Control unit 14 also contains a memory 15. Control unit 14 controls a horn 17.

Figure 2:
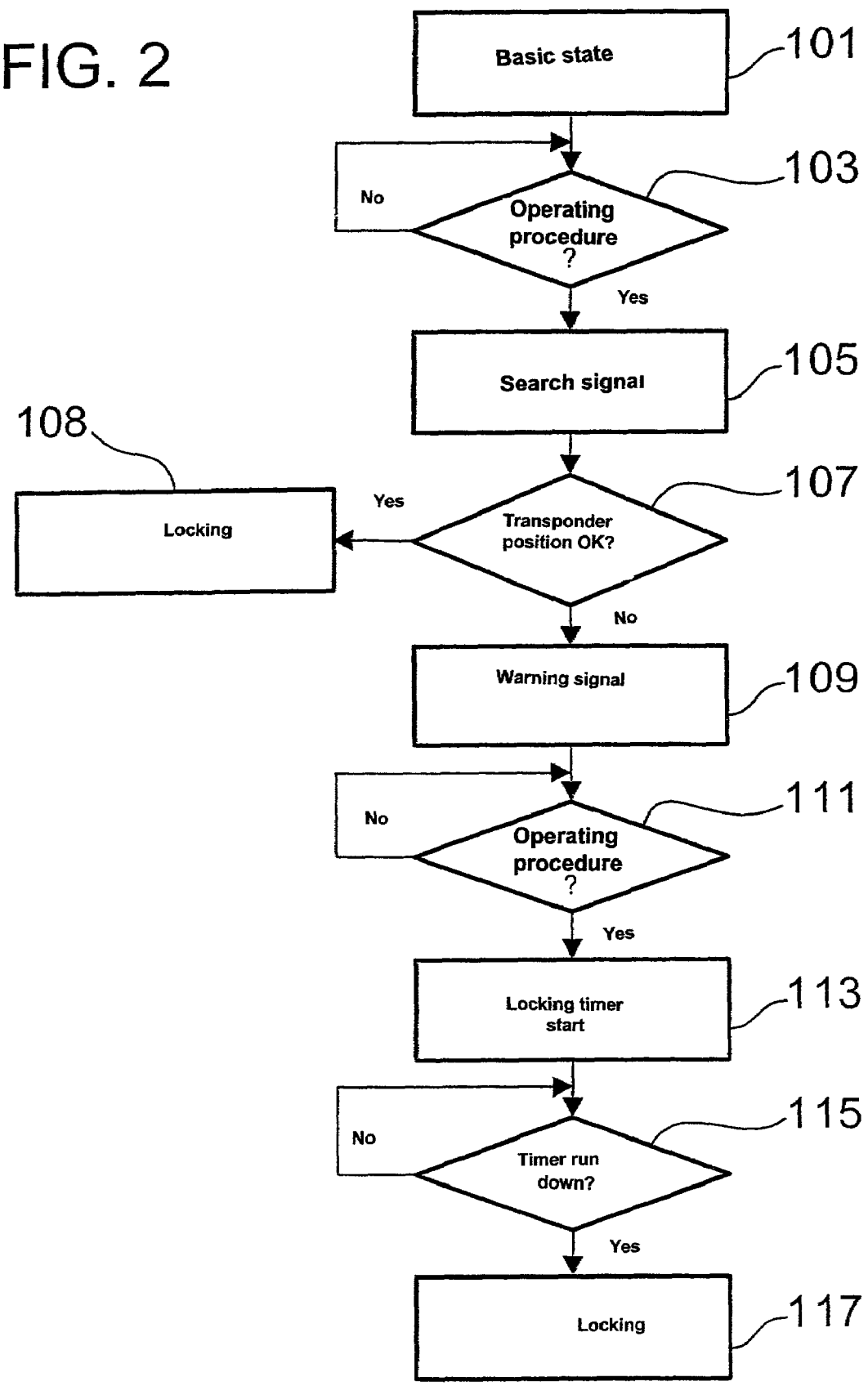
FIG. 2 shows a flow chart of the embodiment.

This embodiment is described below on the basis of the flow chart according to FIG. 2. In the basic state, step 101, the engine of motor vehicle 8 has been turned off, the driver has left vehicle 8 and his door is closed. He would then like to lock vehicle 8. Left and right exterior operating elements 16, 18 are monitored for operation. If the output signal of one of outside operating elements 16, 18 changes, signal detection 20 relays the operating procedure, which is interpreted as a locking command, to control unit 14 over bus system 28. As an alternative operating procedure, operation of transponder operating element 32 could cause transponder 30 to send a locking command, which is relayed to control unit 14 over transceivers 10, 12 and bus system 28. Only if one of these operating procedures is detected is step 105 carried out. In this step, control unit 14 causes transceivers 10, 12 to send out a search signal. Left and right transceivers 10, 12 are preferably arranged on the B post of the motor vehicle. Through appropriate activation of transceivers 10, 12, an electromagnetic signal is emitted into the interior and also into the left and right exterior. The search signal causes transponders 30 within its range to send back a response signal. To obtain an unambiguous correlation of multiple transponders 30, a corresponding time slot, within which the response signal of respective transponder 30 is expected and which is known to be admissible by control unit 14, is assigned to each transponder 30.

A first transponder sends its response signal within a first time slot, a second transponder sends its response signal within a subsequent second time slot, etc. On the basis of this time allocation, control unit 14 determines which transponders 30 are within the detection range. Control unit 14 determines the position of respective transponder 30 on the basis of incoming transceiver signals. If transponder 30 is in the left outside area, only one signal is received by left transceiver 10 within the respective time slot. In the case of a transponder 30 in the interior of the vehicle, both left and right transceivers 10, 12 receive a response signal from transponder 30. A response signal received only by right transceiver 12 indicates that transponder 30 is located in the right outside area.

On the basis of the incoming transceiver signals, control unit 14 checks on whether one of the following conditions is met, step 107. If at least one transponder 30 is in the interior of motor vehicle 8 and/or if a transponder 30 has been detected in an outside area opposite the operating element 16, 18 which has been actuated and has triggered the locking command, the system executes the actions in step 109. Thus for example, the system switches to step 109 if the driver without the transponder operates left outside operating element 16 for the purpose of locking it and a passenger with a transponder is in the right outside area. This checks on whether the locking is carried out immediately only if the driver with respective transponder 30 on the driver's side has actuated left outside element 16. If this is the case, locking is carried out, step 108. Otherwise, control unit 14 controls outside light 22 and/or horn 17 in the sense of a warning signal to draw the attention of the user to an unusual transponder position, step 109. However, the locking is not yet carried out. This is performed only if an outside operating element 16, 18 and/or transponder operating element 32 has been actuated again. The corresponding query about operation takes place in step 111. The user is thus active again to perform the locking. It is thus assumed that although the user is aware of the critical transponder position, he is willing to actively take it into account. After the operation of outside operating elements 16, 18 had been completed, closing system 24 is activated in the sense of locking and at the same time a timer is started, step 113. Locking here is understood to be the situation which suppresses opening of the door via the outside door handle but allows opening via inside operating elements 26.

If a person is in the interior of motor vehicle 8, this person can leave the vehicle until the timer has reached the predefinable period of time. This condition is checked in step 115. After the specified period of time has elapsed, the motor vehicle is locked so that the door cannot be opened from the inside, or from the outside, step 117. On locking of motor vehicle 8, transponders 30, which are located in the interior and were detected in query 107, are deactivated. To do so, information that a signal delivered by a transponder 30 located in the interior has not been recognized as permissible is stored in control unit 14 and thus neither locking and unlocking nor driving authorization of motor vehicle 8 can be obtained. In addition to the deactivation information on transponder 30 in the interior, additional information is also stored in memory 15, describing the time or the kilometer reading of the transponder deactivation, for example.

Deactivated transponders 30 can be activated if motor vehicle 8 has been unlocked regularly with the help of a transponder 30 which is still valid. It is then assumed that an authorized user has gained access to transponders 30 in the interior of the vehicle. The warning emitted in step 109 may also be displayed on a display present in motor vehicle 8. This is a message that a transponder 30 is present in the interior or that transponder 30 is in the opposite outside area. A corresponding voice output could also be provided.

What is claimed is:

1. A method of keyless locking of a motor vehicle that includes a transponder that exchanges a code with a transceiver, the motor vehicle including a control unit that compares the code with an expected code and, if a match is found, controls a closing system of the motor vehicle by locking the motor vehicle, the motor vehicle including at least one display arrangement activated by the control unit and including at least one operating element on an operation of which a locking command is generated, the method comprising the steps of:

causing the transceiver to deliver a search signal when the at least one operating element is actuated in order to determine a position of the transponder on the basis of the code sent back by the transponder;

activating the at least one display arrangement when the transponder is on a side of the motor vehicle opposite the actuated at least one operating element; and activating the closing system by locking the closing system when the at least one operating element is actuated again after activation of the at least one display arrangement, independently of the position of the transponder.

2. A method of keyless locking of a motor vehicle that includes a transponder that exchanges a code with a transceiver, the motor vehicle including a control unit that compares the code with an expected code and, if a match is found, controls a closing system of the motor vehicle by locking the motor vehicle, the motor vehicle including at least one display arrangement activated by the control unit and including at least one operating element on an operation of which a locking command is generated, the method comprising the steps of:

causing the transceiver to deliver a search signal when the at least one operating element is actuated in order to determine a position of the transponder on the basis of the code sent back by the transponder;

activating the at least one display arrangement when the transponder is at least one of in an interior of the motor vehicle and on a side of the motor vehicle opposite the actuated at least one operating element; and activating the closing system by locking the closing system when the at least one operating element is actuated again after activation of the at least one display arrangement, independently of the position of the transponder.

3. The method according to claim 2, wherein:

the closing system is activated to lock the motor vehicle so that a vehicle door can be opened only by at least one internal operating element in the interior of the motor vehicle.

4. The method according to claim 2, wherein:

the closing system is activated to lock the motor vehicle so that a vehicle door can be opened by an internal operating element only for a period of time.

5. The method according to claim 2, wherein:

an opening of a vehicle door by an internal operating element is not possible after a period of time has elapsed.

6. The method according to claim 2, further comprising the step of:

deactivating the transponder, when recognized in the interior, so that the code sent by the transponder is not recognized as permissible.

7. The method according to claim 2, further comprising the step of:

storing additional information in a memory on deactivation of the transponder located in the interior of the motor vehicle.

8. The method according to claim 2, wherein:

an activation of the transponder that has been deactivated occurs on unlocking the closing system.

9. The method according to claim 2, wherein:

the transceiver includes a left transceiver arranged on a left side of the motor vehicle and a right transceiver arranged on a right side of the motor vehicle; and the position of the transponder is determined on the basis of signals received from the transponder by the left and right transceivers.

10. The method according to claim 9, wherein the transponder is determined to be positioned near the left side of the motor vehicle if only the left transceiver substantially receives a signal from the transponder, and wherein the transponder is determined to be positioned near the right side of the motor vehicle if only the right transceiver substantially receives a signal from the transponder.

11. The method according to claim 9, wherein the transponder is determined to be positioned in the interior of the motor vehicle if both the left and right transceivers substantially receive a signal from the transponder.

* * * * *

UNITED STATES PATENT AND TRADEMARK OFFICE
CERTIFICATE OF CORRECTION

| | | |
|---|---|---|
| PATENT NO. | : 6,937,137 B1 | Page 1 of 1 |
| APPLICATION NO. | : 10/009670 | |
| DATED | : August 30, 2005 | |
| INVENTOR(S) | : Elmar Giehler et al. | |

It is certified that error appears in the above-identified patent and that said Letters Patent is hereby corrected as shown below:

Column 1, line 41, change "A looking command" to --A locking command--.

Signed and Sealed this

Thirty-first Day of October, 2006

JON W. DUDAS
*Director of the United States Patent and Trademark Office*